No. 825,454. PATENTED JULY 10, 1906.
C. L. GOEHRING & W. TROCHE.
GLASS GRINDING MACHINE.
APPLICATION FILED MAY 18, 1904. RENEWED DEC. 13, 1905.
6 SHEETS—SHEET 2.
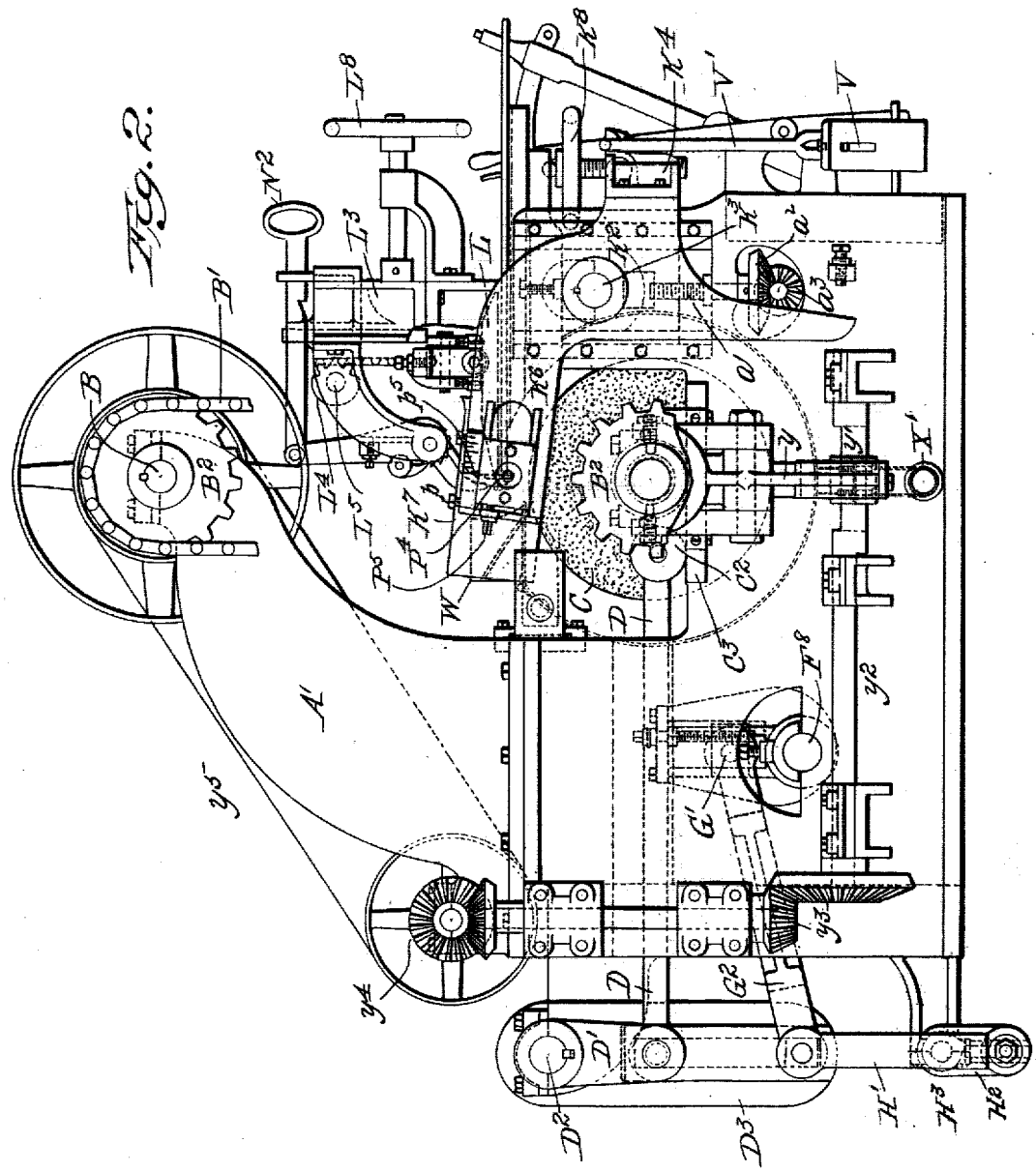
Witnesses
Edwin L. Yewell
Thomas Durant
Inventors
Charles L. Goehring
William Troche
By Church & Church
their Attorneys

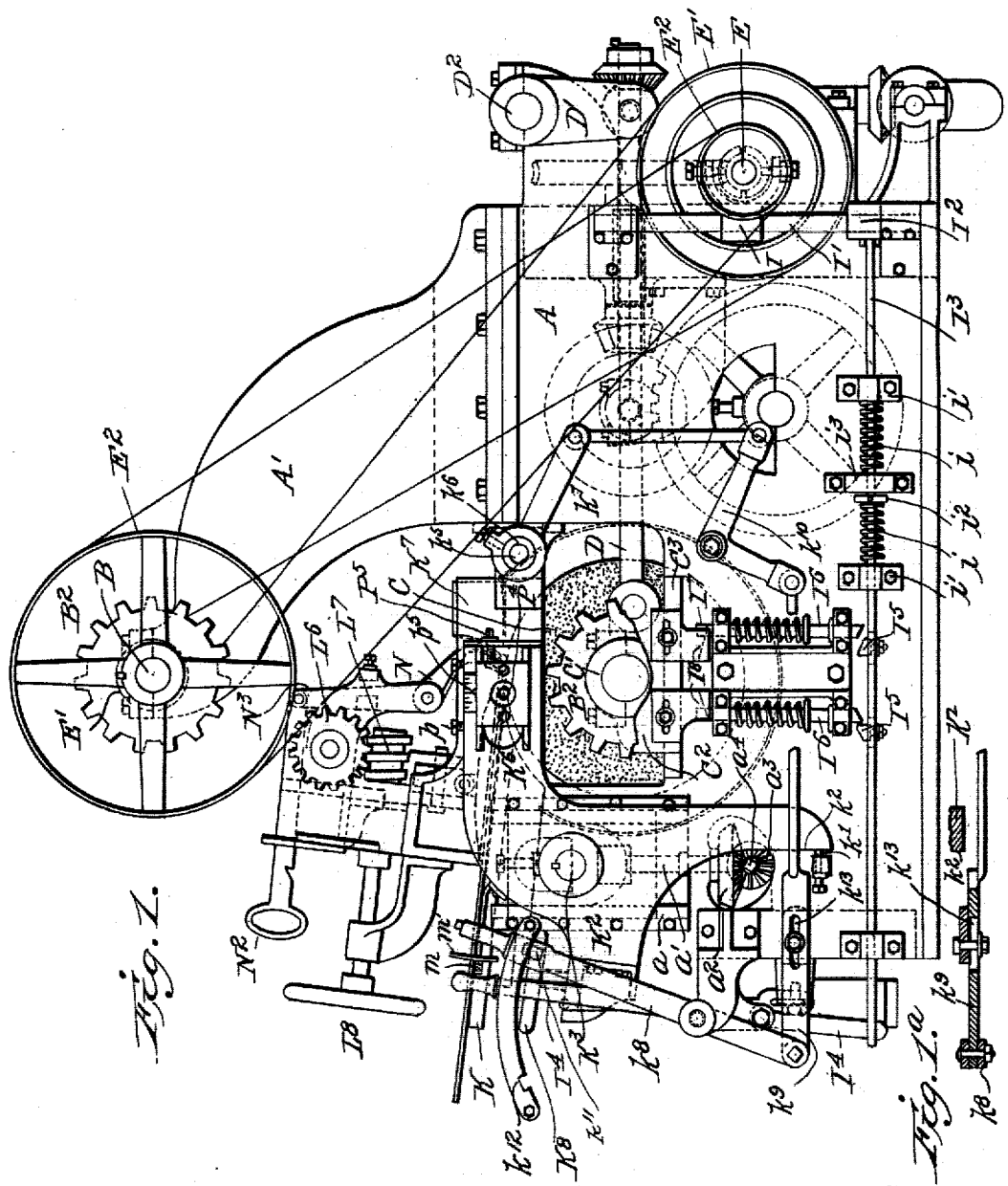

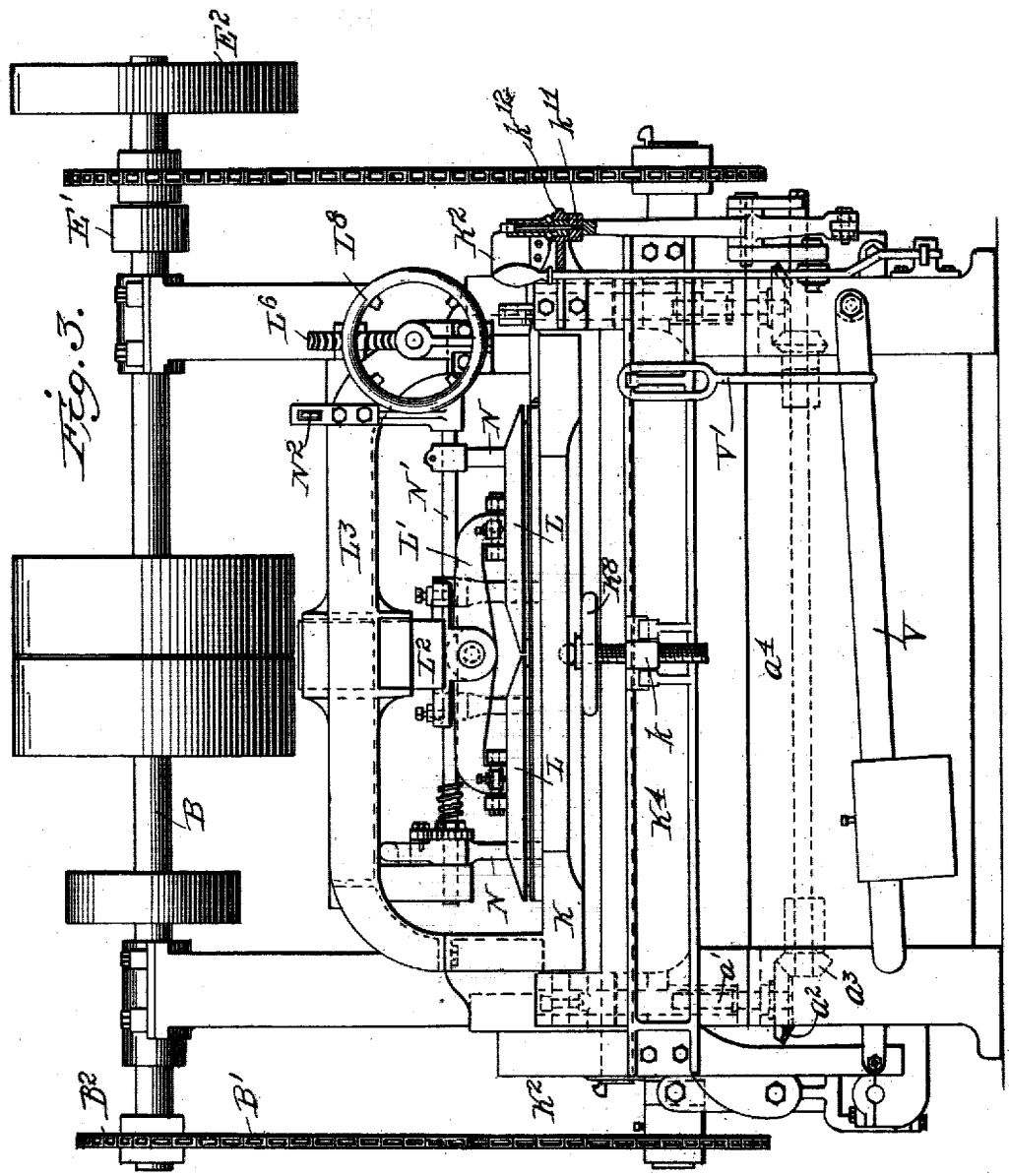

No. 825,454. PATENTED JULY 10, 1906.
C. L. GOEHRING & W. TROCHE.
GLASS GRINDING MACHINE.
APPLICATION FILED MAY 18, 1904. RENEWED DEC. 13, 1905.
6 SHEETS—SHEET 4.
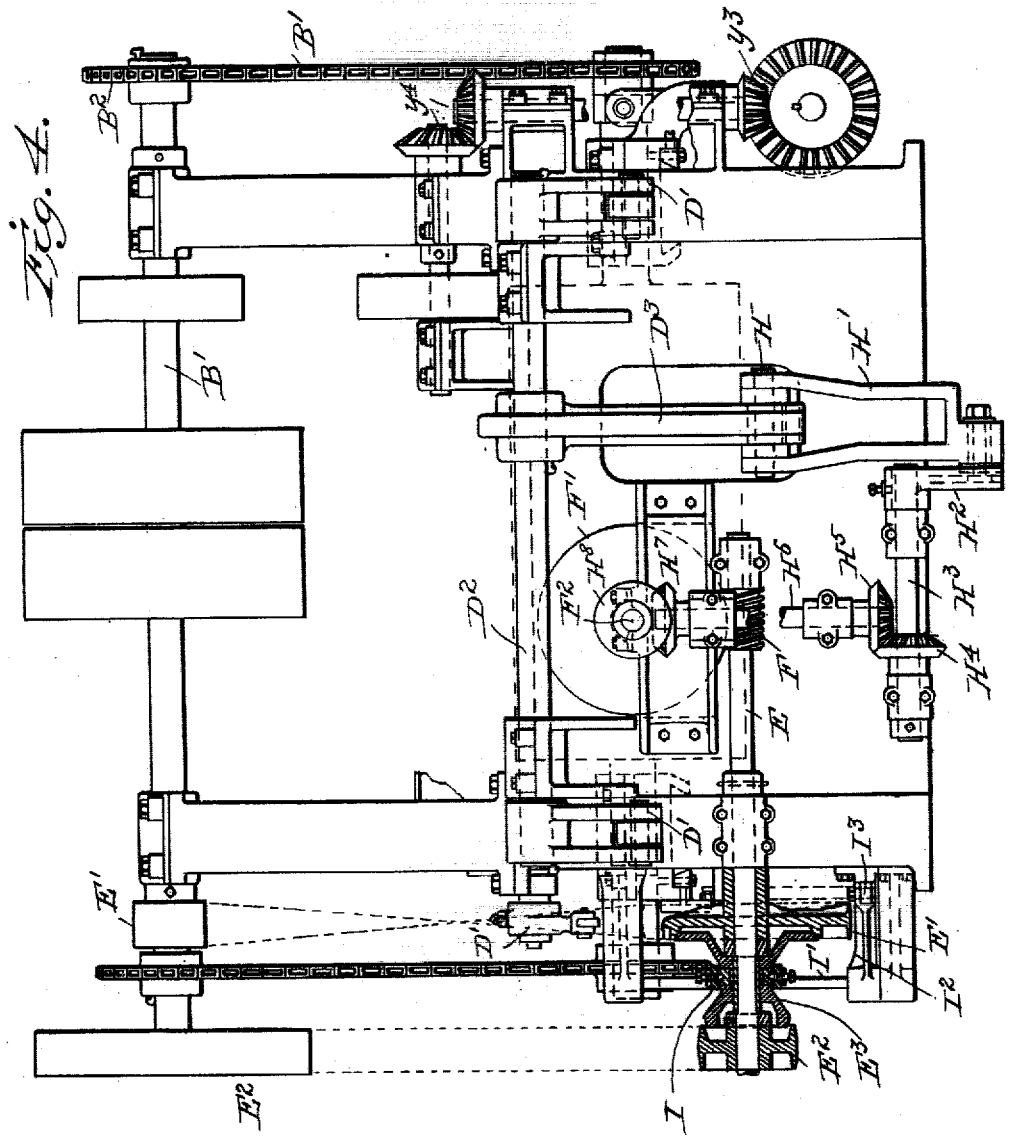
Witnesses
Edwin L. Yewell
Thomas Durant
Inventors
Charles L. Goehring
William Troche
By Church & Church
their Attorneys

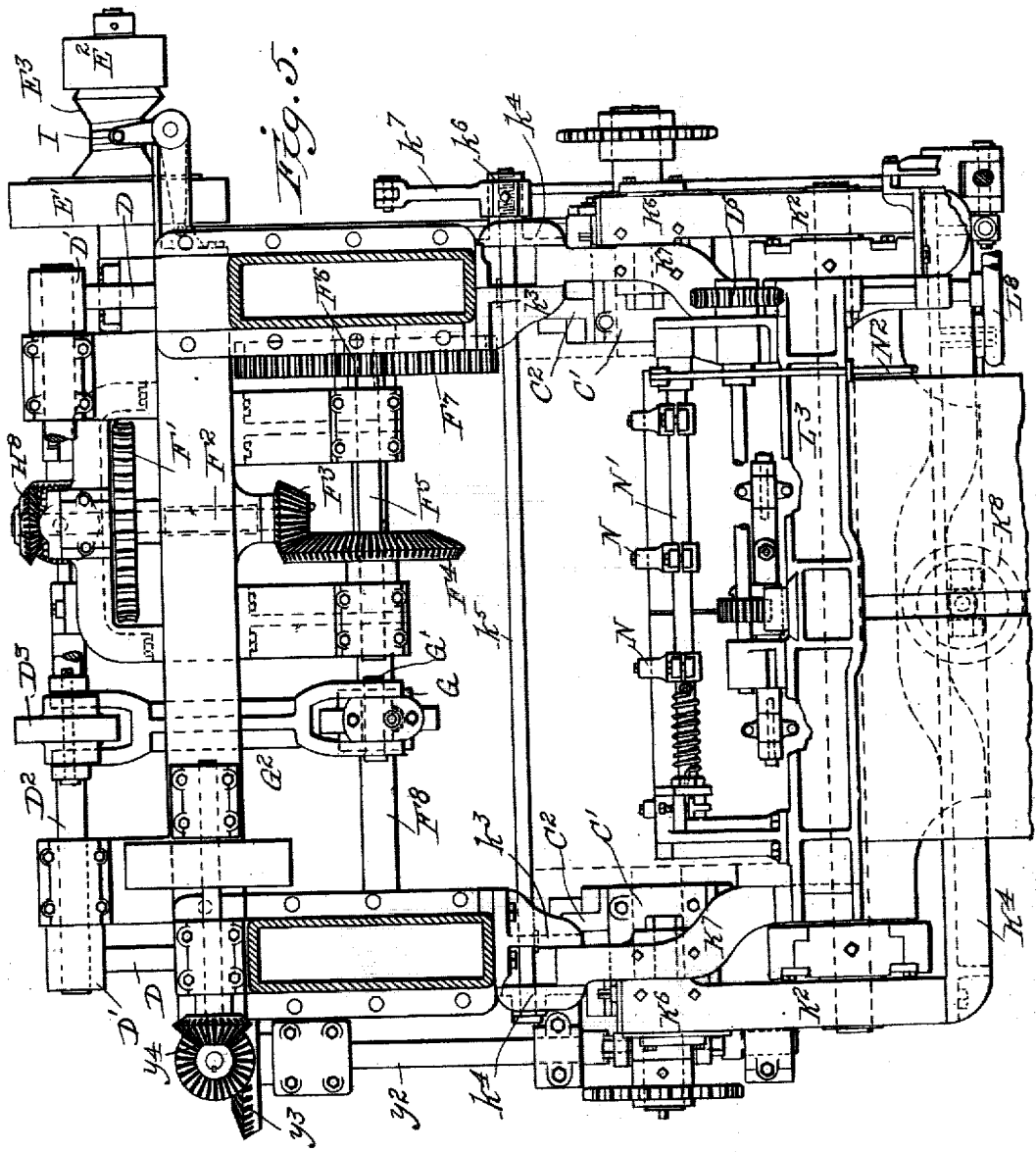

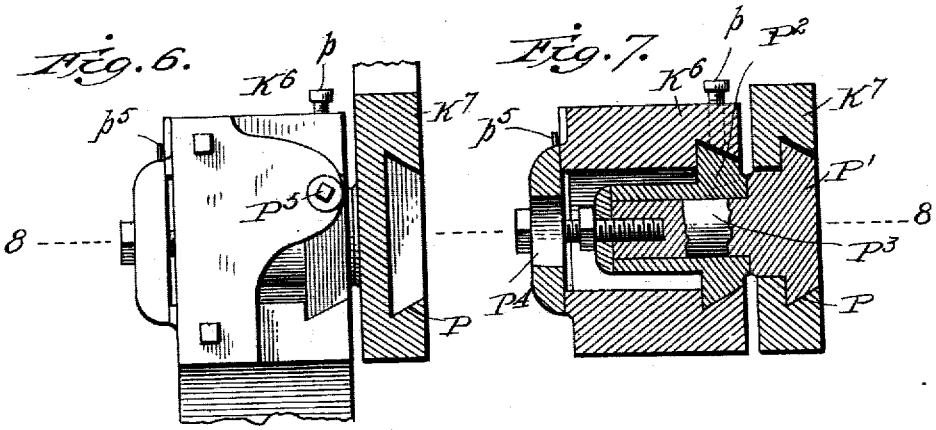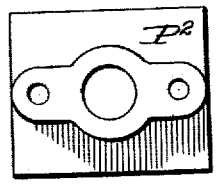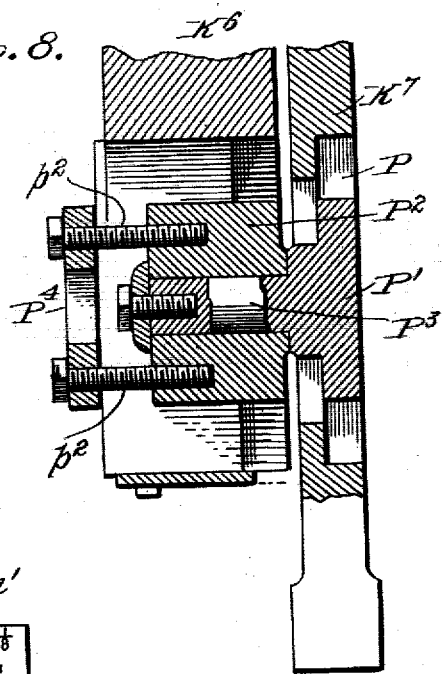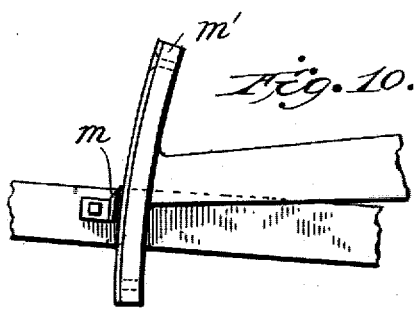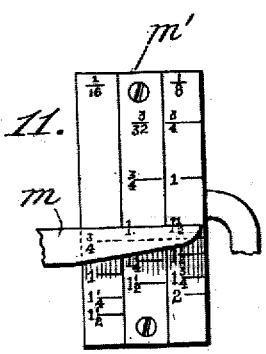

UNITED STATES PATENT OFFICE.

CHARLES L. GOEHRING AND WILLIAM TROCHE, OF AKRON, OHIO; SAID TROCHE ASSIGNOR TO SAID GOEHRING.

GLASS-GRINDING MACHINE.

No. 825,454.  Specification of Letters Patent.  Patented July 10, 1906.

Application filed May 18, 1904. Renewed December 13, 1905. Serial No. 291,630.

*To all whom it may concern:*

Be it known that we, CHARLES L. GOEHRING and WILLIAM TROCHE, citizens of the United States, residing at Akron, in the county of Summit and State of Ohio, have invented certain new and useful Improvements in Glass-Grinding Machines; and we do hereby declare the following to be a full, clear, and exact description of the same, reference being had to the accompanying drawings, forming a part of this specification and to the letters of reference marked thereon.

This invention relates to improvements in glass-grinding machinery, and more especially to machinery for beveling plates by a grinding operation, although features of the invention are applicable to glass-grinding generally.

The objects of the invention are to simplify and improve the mechanical construction and arrangement of the parts, whereby the handling of the glass is facilitated, the speed of operation increased, and the wear and tear on the working mechanism reduced to a minimum.

The invention consists in certain novel details of construction and combinations and arrangements of parts, all as will now be described, and the particular features of novelty pointed out in the appended claims.

Referring to the accompanying drawings, Figure 1 is an elevation looking at the right-hand side of a beveling-machine embodying the present improvements, portions being broken away or omitted to prevent obscurity. Fig. 1$^a$ is a detail sectional view. Fig. 2 is a similar view looking at the opposite side of the machine. Fig. 3 is a front elevation. Fig. 4 is a rear elevation; Fig. 5, a top plan view with the overhanging arms, a drive-shaft with attached parts broken away. Figs. 6, 7, 8, and 9 are detail sections and elevations of the adjustable pivotal support for the glass bed and clamps. Figs. 10 and 11 are detail views of the pointer and scales for indicating the angular adjustment of the bed and clamps for controlling the depth of the bevel.

Like letters of reference in the several figures indicate the same parts.

By reference to Figs. 1 to 5 it will be seen that the working parts of the machine are mounted in a frame A of approximately rectangular form and having an overhang or upwardly-extending arms A', in which the main drive-shaft B is journaled. The grinder C, which in the present instance is in the form of a cylinder, is located below the main drive-shaft and below the level of the glass plate, so as to operate on the under side of the rear edge of the plate. It is supported in bearings C', through which the shaft of the grinder passes, and said bearings are in turn mounted on or form portions of a carriage or carriages C$^2$, adapted to slide on ways C$^3$, extending parallel to the plane of the bevel or surfaces to be ground and preferably formed in the side portions of the frame A. As shown, the ways C$^3$ extend horizontally from front to rear of the machine, and the grinder has a movement thereon corresponding to the necessary traverse in cutting a bevel from one edge to the other of the ground surface. Rotation is imparted to the grinder by drive-chains B', running over sprocket-wheels B$^2$ on the drive-shaft and grinder-shaft, respectively, a sufficient slack being left in said chains to permit the grinder to move on the ways C$^3$, as well as to move longitudinally of its axis, as will be hereinafter pointed out.

The power for moving the grinder on the ways C$^3$ or causing it to traverse with respect to the work is transmitted to the carriages C$^2$ by connecting-rods D, extending back to the rear of the machine and jointed to crank-arms D' on a transverse rock-shaft D$^2$. The rock-shaft D$^2$ is oscillated through gearing and driving connections with a secondary drive-shaft E, the latter receiving its motion from the main drive-shaft B through suitable pulleys E' E' and E$^2$ E$^2$, the belt connecting the pulleys E' E' being a crossed belt, whereby the pulleys E' E$^2$ on the shaft E will be rotated in opposite directions. It will be understood that said pulleys E' E$^2$ on the shaft E are loose thereon, and the connection between said pulleys and the shaft E is effected by the clutch, (shown in section in Fig. 4 at E$^3$,) which clutch when moved in one direction longitudinally of the shaft will effect the engagement of one of the pulleys and when moved in the opposite direction will effect the engagement of the other of the pulleys, both pulleys being free when the clutch is in an intermediate position. The shaft E carries a worm F, meshing with a worm-gear F' on a short shaft F$^2$, journaled in the main frame and carrying at its forward end a beveled pinion $F^3$, meshing with a bevel-wheel $F^4$ on a transverse shaft $F^5$. The latter shaft $F^5$ carries a pinion $F^6$, meshing with a gear $F^7$ on a second transverse shaft $F^8$, preferably extending entirely across the frame of the machine and having a central crank-arm G, provided with an adjustable crank-pin $G'$, Fig. 2, to which a link or adjustable connecting-rod $G^2$ is jointed at one end. The opposite end of said link or connecting-rod is connected with a central crank-arm $D^3$ on the shaft $D^2$, before described. The connections between the connecting-rod or link $G^2$ and the crank $D^3$ is a shiftable connection, whereby the said connection may be moved nearer to or farther from the axis of the shaft $D^2$ to effect a relatively rapid or slow traverse of the grinder.

The mechanism illustrated is designed to give the grinder a rapid movement during the initial and final portions of its traverse, with a slower intermediate movement. The reason for this is that during the initial and final portions of the movement the work done by the grinder and friction between the grinder and glass are relatively light, and as a consequence the grinder may be advanced with rapidity; but during the time the grinder is removing the greatest thickness of glass the friction and resistance are great, and the grinder should be given a correspondingly slow movement of traverse, both in order to effect a more perfect grinding and to prevent stalling the machine or breaking the glass by excessive pressure. The movements referred to are automatically accomplished by automatically shifting the connection between the link $G^2$ and crank-arm $D^3$, for which purpose the said connection is formed by a shaft H, mounted in the upper end of a link or fork $H'$, Fig. 4, the latter in turn being carried by a crank-arm $H^2$ on a short transverse shaft $H^3$. The shaft $H^3$ carries a bevel-gear $H^4$, meshing with a corresponding gear $H^5$ on a vertical shaft $H^6$. Shaft $H^6$ carries a bevel-gear $H^7$, meshing with a bevel-gear $H^8$ on the shaft $F^2$. The gearing between the shafts $F^2$ and $H^3$ is so proportioned that the said shafts will be rotated in unison, and when the stone or grinder is at either extreme of its traverse the crank $H^2$ is turned to its highest position, or with the connection between the link $G^2$ and crank $D^3$ in its position of adjustment nearest the shaft $D^2$. During the traverse of the stone the shaft $H^3$ will have made one complete revolution and the said connection will have been moved first down or away from the shaft $D^2$, thereby gradually decreasing the speed of grinder traverse until a minimum is reached half-way between the extreme of the movement and then back to its initial position, again increasing the speed of the movement to its maximum.

The proportioning of the gearing between the shaft $F^2$ and the shaft $F^8$ is preferably such that one complete rotation of the shaft $F^2$ will move the shaft $F^8$ through approximately one-eighth of a revolution. The movement of the shaft $F^8$ through this portion of the arc of a circle gives a practically uniform thrust and speed to the outer end of the connecting-rod $G^2$ and in range is sufficient to effect the desired traverse of the grinder.

As before stated, the traverse movements of the grinder are controlled by the clutch $E^3$, and in order to automatically arrest the movement at the proper time and to permit of the inauguration of the movements by the attendant the said clutch is controlled by a clutch-arm I, mounted on a vertical shaft $I'$, Figs. 1 and 4, having at its lower end an operating-arm $I^2$, connected to the rear end of a shifting rod $I^3$, mounted in suitable guides on the frame and provided at its forward end with an operating-lever $I^4$, by which the attendant may shift the clutch in one direction or the other. On the rod $I^3$ are two oppositely-located springs $i$, held between bearings $i'$ on the frame, and between which springs is a pin or projection $i^2$ on the rod $I^3$. These springs serve to bring the rod back into position with the clutch $E^3$ central no matter in which direction the said rod is moved, and to insure the proper positioning of the clutch the pin or projection $i^2$ works through a fork or stop $i^3$ on the frame and normally rests within the same, while the ends of the springs $i$ seat against said fork $i^3$, from which it follows that when in its intermediate position the said pin or projection is free from the springs; but when moved in one direction or the other it will compress one or the other of the springs, leaving the opposite spring unaffected. When the attendant throws the clutch into engagement with one or the other of the pulleys by shifting the rod $I^3$, the clutch is retained in engagement by projections $I^5$ on the rod $I^3$ engaging spring-pressed pawls or stops $I^6$, mounted on the frame, preferably above the rod $I^3$ and having at their upper ends heads or overhanging parts $I^7$, under which knock-off projections or inclines $I^8$, adjustably mounted on the carriage $C^2$, (see Fig. 1,) are adapted to pass as said carriage reaches one or the other of the extremes of its movement. As the knock-off projection lifts the pawl or stop $I^6$ the clutch-rod is released, and the springs automatically shift the clutch to its intermediate position, this movement being effected when the carriage and grinder are moved in either direction, and as a result while the attendant inaugurates the traverse movement of the grinder such movement is automatically arrested at the proper instant, and the attendant must inaugurate a movement in the opposite direction. The pulleys $E'$ $E'$ and $E^2$ $E^2$ are so proportioned as to give a somewhat slow advance movement to the grinder and a relatively rapid return or reverse movement.

The glass or work to be beveled is clamped against a bed located on the same side of the work as that upon which the grinder is located. In the machine illustrated the bed against which the work is clamped is therefore located below the work, inasmuch as in this machine the work passes above the grinder. The bed referred to is indicated in the accompanying drawings by the letter K, and while it is held in fixed position during the grinding operation it is nevertheless adapted to be adjusted in such manner that the work may have bevels of different depth or width ground thereon.

As before stated, the glass is clamped against the upper surface of the bed K, the clamping being effected by a plurality of clamps L, (operated by means to be presently described,) and the bed K and clamps are preferably carried by a frame K', angularly adjustable in a vertically-adjustable swinging frame formed by side pieces $K^2$, journaled in the main frame at $K^3$ and connected by a cross-piece $K^4$. The frame K' is provided with extensions of the side piece $K^2$, forming arms $K^6$, projecting toward and outside of the grinder at each end to provide for the passage of the grinder between them, and the bed K is provided with similar arms $K^7$, Figs. 1, 2, 5, 7, and 8, the ends of the arms $K^6$ and $K^7$ being pivotally connected on an adjustable axis which is in line with the upper surface of the bed and as nearly as possible coincident with the inner edge of the bevel, as shown in Figs. 1 and 2.

In operation it is designed that the frame formed by the side pieces $K^2$, &c., shall be swung on its pivots $K^3$ to bring the bed, clamps, and glass held thereby down into beveling position, the swinging movement of the parts being limited by adjustable stops k', Fig. 1, with which flat faces $k^2$ on the side pieces $K^2$ contact, and to lock the parts with the glass in grinding position the ends of the arms $K^7$ are adapted to be clamped and held by a manually-controlled locking mechanism. This locking mechanism preferably consists of clamps $k^3$ on the main frame and movable clamps $k^4$, controlled by a cross-rod $k^5$, on one end of which is a nut $k^6$, adjustably connected with a lever-arm $k^7$. The ends of the arms $K^7$ pass between the clamps, and when the lever-arm $k^7$ is turned the clamps are drawn tightly together, thereby locking the glass-supports rigidly in position. For manually controlling the locking-clamps a hand-lever $k^8$ is provided, said lever being connected with the lever-arm $k^7$ by connecting-rods $k^9$ and a bell-crank lever $k^{10}$. The hand-lever itself may be locked by a spring-pressed pawl $k^{11}$, Figs. 1 and 3, engaging a notch in the guide-segment $k^{12}$, and in the preferred construction an adjustable shoulder $k^{13}$, Fig. 1ª, is provided on the connecting-rod $k^9$ and adapted to engage the lower portion of one of the side pieces $K^2$, so as to raise the glass from the grinder by a continued movement of the hand-lever $k^8$ after the clamps have been released.

The pivots $K^3$ are preferably made vertically adjustable, for which purpose their bearings are guided in vertical ways a on the main frame and supported by screws a', journaled in the main frame and having bevel-gears $a^2$ at their lower ends, with which similar gears $a^3$ on a cross-shaft $a^4$ mesh, whereby the pivots may be simultaneously adjusted to raise or lower the whole glass-holding mechanism with relation to the grinder.

By pivoting the bed on an axis coincident with the inner edge of the bevel the angle or inclination of the bed may be varied to give different depths of bevel without changing the width of the bevel, and provision is made for adjusting the angle of the bed and holding it in adjusted position through the medium of an adjusting-screw $K^8$, journaled in a swing-bearing k on the cross-piece $K^4$.

The axis on which the bed and clamps are angularly adjustable may be in line with either edge of the bevel or at an intermediate point, but is preferably at the inner edge in order that the depth of the bevel may be varied by simply adjusting the angular position of the bed. To make provision for varying the width of the bevel, the axis is made adjustable nearer to or farther from the edge of the glass, and by reference, particularly to Figs. 6, 7, and 8, it will be seen that the arms $K^6$ and $K^7$ are slotted to form ways P, in which bearing-blocks P' $P^2$ may slide. Said blocks are pivotally connected by a journal $P^3$ and are adapted to be secured in adjusted position by set-screws p or by a clamping-plate $P^4$, lying outside of the arm $K^6$ and adapted to be clamped to the block $P^2$ by screws $p^2$. The blocks and journal may be conveniently adjusted by an adjusting-screw $P^5$, and the position of adjustment may be indicated by graduations and a pointer $p^5$, as shown clearly in Fig. 1. These graduations and pointer $p^5$ will indicate the width of the bevel or the distance of the axis from the edge of the glass, and in order that the depth may be readily indicated the bed K is provided with a pointer m and the frame $K^2$ with a series of scales for indicating the adjustments necessary for different depths of bevel where the width is known.

Fig. 11 shows the pointer and scales clearly, and by reference to this figure it will be seen that three sets of graduations are illustrated, the first indicating one-sixteenth of an inch depth, the second three thirty-seconds, and the third one-eighth. The graduations in each column indicate the adjustment or angular position of the bed necessary to form bevels of these depths where the width is as indicated by the graduations. For illustration, if the machine is set for bevels one inch wide and the plate requires a bevel one-eighth deep, the bed is adjusted until the pointer registers with the one-inch graduation in the one-eighth column. If the next plate is thin and requires but a bevel one-sixteenth deep, the pointer is made to register with the one-inch graduation in the one-sixteenth column.

The graduations or scales, it is obvious, may be extended sufficiently to embrace all ordinary requirements of the trade, and at the same time the adjustments are so simple and clear that the work may be performed by ordinary unskilled labor.

The plural clamps L for pressing the glass down on the bed K are preferably suspended by somewhat loose joints from the ends of an evener L', which latter is in turn pivotally supported on the lower end of a slide $L^2$, working vertically in a guide in the circle $L^3$ of the bed. To operate the clamps and slide, the latter is formed with a rack on its rear side, with which a pinion $L^4$ meshes. Pinion $L^4$ is mounted on a shaft $L^5$, which also carries a worm-gear $L^6$ and a worm $L^7$, controlled by a hand-wheel $L^8$, serves to both operate and lock the parts in adjusted position.

Stop-arms N, mounted on a shaft N', serve as a means for accurately positioning the edge of the glass, said arms being adapted to be swung up out of the way of the grinder by means of a hand-bar $N^2$, connected with the shaft N' by an arm $N^3$, as has heretofore been employed in this class of machines.

Inasmuch as the greatest weight is on one side of the axis on which the whole glass-holding mechanism turns, a counterbalance in the form of a weighted lever V, connected to the cross-piece $K^4$ by a link V', is preferably provided to assist the attendant in raising the glass from the grinder after the beveling operations have been completed.

In the present machine it will be observed that the grinder is located below the level of the glass and on substantially horizontal ways. Where the grinder is located below the level of the glass, it is entirely practicable to use an abrasive in comminuted form—such, for instance, as sand, emery, and the like—and such abrasive material may be fed to the top of the grinder from a sand-box W. The grinder may be located in a chamber or compartment formed by the partition X, dotted lines, Fig. 2, having an outlet or discharge duct X' at one side of the machine, as shown clearly in Fig. 2. Thus the grinder may, if desired, be run with its lower portion in a body of water so as to insure a full supply of water to the grinding-point.

When desired, the grinder may be given a longitudinal movement by means of a lever y, pivoted on the main frame and oscillated by a crank y' on the shaft $y^2$, the latter being rotated through gearing $y^3$ $y^4$ and a belt $y^5$, extending up to a pulley on the drive-shaft B.

Having thus described our invention, what we claim as new, and desire to secure by Letters Patent, is—

1. In glass-grinding machinery, the combination with an angularly-movable frame a bed against which the glass is positioned angularly adjustable in said frame and a rotary grinder, said bed and grinder both located below the plane of the glass and having a traverse with respect to each other to effect the grinding operation, of means located above the plane of the glass for clamping the glass against the bed; substantially as described.

2. In a glass-grinding machine, the combination with a grinder and a pivotally-adjustable bed both located below the plane of the glass and having a traverse with respect to each other to effect the grinding operation and whereby the angle of the plane of the glass may be varied with respect to the plane of the traverse, of means located above the plane of the glass for clamping the glass against the bed and a pivoted frame in which the bed and clamping means are mounted, adapted to turn on its axis in moving the glass toward and from the grinder; substantially as described.

3. In a glass-grinding machine, the combination with the glass-support, of a rotary cylindrical grinder journaled in bearings mounted on ways located below and extending transversely of but parallel with the plane of the surface to be ground at right angles to the axis of the grinder, means for effecting a traverse of the grinder on said ways and means for rotating the grinder during such traverse; substantially as described.

4. In a glass-beveling machine, the combination with the grinder, of a pivoted frame, a bed against which the glass is clamped pivotally mounted in said frame on an adjustable axis and means for clamping the glass against the bed and for adjusting the angular position of said bed in the pivoted frame.

5. In a glass-beveling machine, the combination with the grinder, of a pivoted frame formed of side pieces having rearwardly-projecting arms, a bed against which the glass is clamped having rearwardly-projecting arms, adjustable pivotal connections between the arms on the bed and side pieces, means for controlling the angular position of the bed around said pivotal connection and means for controlling the angular position of the side pieces with relation to the grinder; substantially as described.

6. In a glass-beveling machine, the combination with the grinder and a pivotal frame embodying side pieces having rearwardly-projecting arms, of a bed mounted in said pivoted frame between the rearwardly-extending arms and a locking mechanism coöperating with said arms for holding said frame and bed against pivotal movement; substantially as described.

7. In a glass-beveling machine, the combination with the grinder, the pivoted frame, the bed against which the glass is clamped mounted in said frame and means for clamping the glass against said bed, of a locking mechanism embodying clamps, a screw for moving said clamps toward each other, and a manually-controllable lever for operating said screw; substantially as described.

8. In a glass-beveling machine, the combination with the grinder, the pivoted frame, the bed against which the glass is clamped mounted in said frame, and means for clamping the glass against the bed, of a locking mechanism for the frame and bed, and a hand-lever with connections between said hand-lever, locking mechanism and frame, whereby when the hand-lever is moved, the locking mechanism will be released and the frame moved on its axis.

9. In a glass-beveling machine, the combination with the grinder, pivoted frame, the bed against which the glass is clamped pivotally mounted in said frame and means for clamping the glass against said bed, of a locking mechanism for holding the bed against pivotal movement, a hand-lever and connections between said hand-lever pivotal frame and locking mechanism, for releasing the locking mechanism and by a continued movement tilting said frame on its axis.

10. In a glass-beveling machine, the combination with the grinder, the pivoted frame, the bed against which the glass is clamped mounted in said frame and having rearwardly-projecting arms and means for clamping the glass against said bed, of locking-clamps coöperating with the rearwardly-projecting arms of the bed and means for operating said clamps to lock the bed against movement; substantially as described.

11. In a glass-beveling machine the combination with the grinder, the pivoted frame, the bed against which the glass is clamped pivotally mounted in said frame and having rearwardly-projecting arms, of means for adjusting the angular position of the bed in the frame, locking-clamps coöperating with the rearwardly-projecting arms and manually-controlled means for operating said clamps; substantially as described.

12. In a glass-beveling machine the combination with the rotary grinder mounted on substantially horizontal ways, means for rotating said grinder and means for moving it on said ways transversely of its axis of rotation, of a pivoted frame and bed against which the glass is clamped pivotally mounted in said frame on an axis substantially coincident with the bevel, means for limiting the pivotal movement of the frame and means for adjusting the angular position of the bed in the frame; substantially as described.

13. In a glass-grinding machine, the combination with the grinder, of the pivoted frame having rearwardly-projecting arms with guideways therein, a bed against which the glass is clamped, having rearwardly-projecting arms with guideways therein, pivotally-connected blocks mounted in the guideways in said arms and means for locking said blocks in adjusted position whereby the pivotal axis of the bed in the frame may be varied in accordance with the width of the bevel to be formed.

14. In a glass-grinding machine, the combination with the grinder of a bed against which the glass is clamped, an adjustable axis about which said bed is angularly movable, means for adjusting the angular position of said bed, a pointer and a series of scales indicating the angular position of the bed in forming bevels of different depth and width; substantially as described.

CHARLES L. GOEHRING.
WILLIAM TROCHE.

Witnesses:
H. M. HOLLINGER,
MARY MARTIN.